United States Patent
Ordas et al.

(10) Patent No.: US 10,148,421 B2
(45) Date of Patent: Dec. 4, 2018

(54) ELECTROMAGNETIC JAMMING DEVICE AND METHOD FOR AN INTEGRATED CIRCUIT

(71) Applicant: STMicroelectronics (Rousset) SAS, Rousset (FR)

(72) Inventors: Thomas Ordas, Pourcieux (FR); Alexandre Sarafianos, Trets (FR); Stephane Chesnais, Fuveau (FR); Fabrice Marinet, Chateauneuf le Rouge (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 55 days.

(21) Appl. No.: 15/221,749

(22) Filed: Jul. 28, 2016

(65) Prior Publication Data

US 2017/0250795 A1    Aug. 31, 2017

(30) Foreign Application Priority Data

Feb. 25, 2016   (FR) ..................... 16 51552

(51) Int. Cl.

| | |
|---|---|
| *G06F 21/00* | (2013.01) |
| *H04L 9/00* | (2006.01) |
| *G06K 19/073* | (2006.01) |
| *G09C 1/00* | (2006.01) |
| *H04K 3/00* | (2006.01) |
| *G06F 1/04* | (2006.01) |

(Continued)

(52) U.S. Cl.
CPC ............. *H04L 9/002* (2013.01); *G06F 1/04* (2013.01); *G06F 21/72* (2013.01); *G06K 19/07336* (2013.01); *G09C 1/00* (2013.01); *H01L 23/528* (2013.01); *H03K 3/84* (2013.01); *H03K 5/01* (2013.01); *H04K 3/40* (2013.01); *H04K 3/94* (2013.01); *H04L 9/003* (2013.01); *H03K 2005/00019* (2013.01); *H04L 2209/08* (2013.01); *H04L 2209/805* (2013.01)

(58) Field of Classification Search
None
See application file for complete search history.

(56) References Cited

U.S. PATENT DOCUMENTS

| | | | | |
|---|---|---|---|---|
| 4,467,328 A | * | 8/1984 | Hacker | ............... G01S 7/38 342/14 |
| 6,990,141 B1 | * | 1/2006 | Iwasaki | ............... G06F 17/15 375/150 |

(Continued)

FOREIGN PATENT DOCUMENTS

EP    2587469 A1    5/2013

OTHER PUBLICATIONS

INPI Search Report and Written Opinion for FR 1651552 dated Nov. 8, 2016 (7 pages).

*Primary Examiner* — David Le
(74) *Attorney, Agent, or Firm* — Crowe & Dunlevy

(57) ABSTRACT

A device is provided for jamming electromagnetic radiation liable to be emitted by at least one portion of an interconnect region located above at least one zone of an integrated electronic circuit produced in and on a semiconductor substrate. The device includes an antenna located above the at least one zone of the circuit and generating circuit coupled to the antenna and configured to generate an electrical signal having at least one pseudo-random property to pass through the antenna.

18 Claims, 3 Drawing Sheets

(51) Int. Cl.
  *G06F 21/72*   (2013.01)
  *H01L 23/528*  (2006.01)
  *H03K 3/84*    (2006.01)
  *H03K 5/01*    (2006.01)
  *H03K 5/00*    (2006.01)

(56) References Cited

U.S. PATENT DOCUMENTS

| | | | |
|---|---|---|---|
| 2002/0125546 A1* | 9/2002 | Muta | G06K 19/07749 |
| | | | 257/531 |
| 2003/0119469 A1* | 6/2003 | Karr | H01Q 1/273 |
| | | | 455/307 |
| 2006/0111054 A1* | 5/2006 | Pan | H04B 7/0606 |
| | | | 455/101 |
| 2007/0118335 A1* | 5/2007 | Andarawis | G01M 5/00 |
| | | | 702/188 |
| 2008/0055303 A1* | 3/2008 | Ikeda | G06F 1/1601 |
| | | | 345/214 |
| 2008/0240068 A1* | 10/2008 | Ishimoto | H04W 12/06 |
| | | | 370/345 |
| 2010/0321685 A1* | 12/2010 | Li | G01J 3/02 |
| | | | 356/301 |
| 2011/0246789 A1 | 10/2011 | Feix et al. | |
| 2013/0321053 A1 | 12/2013 | Bogner et al. | |

\* cited by examiner

ELECTROMAGNETIC JAMMING DEVICE AND METHOD FOR AN INTEGRATED CIRCUIT

PRIORITY CLAIM

This application claims priority to French Application for Patent No. 1651552 filed Feb. 25, 2016, the disclosure of which is incorporated by reference.

TECHNICAL FIELD

Modes of implementation and embodiments relate to integrated circuits, especially but not exclusively those including secure modules, and in particular to the protection of this type of circuit from side channel analyses, and more particularly from analyses of the electromagnetic signals produced by the integrated circuit during its operation.

BACKGROUND

In operation, an integrated circuit produces electromagnetic signals by way of metal tracks of the integrated circuit, for example during switching of logic components. By analyzing these electromagnetic signals, using for example an antenna and dedicated mathematical algorithms, it is possible to obtain information on the operations performed and on the data manipulated and/or on their occurrences.

It is therefore recommended to jam as much as possible the electromagnetic signals emitted by the integrated circuit.

SUMMARY

Thus, according to one mode of implementation and embodiment, a method and a device are proposed allowing the electromagnetic emissions of an integrated circuit to be jammed so as to make it even more difficult to deduce the operations performed by the integrated circuit.

According to one aspect, a method is proposed for jamming electromagnetic radiation emitted by a portion of an interconnect region located above at least one zone of an integrated electronic circuit produced in and/or on a semiconductor substrate, the method comprising placing at least one metal antenna above said at least one zone of the integrated circuit and passing through said at least one antenna an electrical signal having at least one pseudo-random property.

In other words, the signal-to-noise ratio of the circuit is decreased by adding an electromagnetic emission source that is independent of the logic of the integrated circuit, so as to make it more difficult to analyze the overall electromagnetic signals emitted by the integrated circuit and to therefore make it more difficult to observe the operation of the circuit via a side channel analysis.

The operation of passing the electrical signal may comprise generating a clock signal, applying pseudo-randomly a fixed or variable delay to at least some of the edges of said clock signal so as to obtain said electrical signal, and transmitting said electrical signal through the antenna.

Thus, here a signal having a form factor (said at least one property) that is pseudo-random is obtained.

According to one mode of implementation, it is possible to place a first antenna and at least one second antenna above said at least one zone of the integrated circuit, the method then possibly comprising selecting at least one of said antennae, and passing said electrical signal through said at least one selected antenna.

According to another aspect, a device is proposed for jamming electromagnetic radiation emitted by at least one portion of an interconnect region located above at least one zone of an integrated electronic circuit produced in and/or on a semiconductor substrate, comprising at least one antenna located above said at least one zone of the circuit and a generating circuit coupled to said at least one antenna and configured to generate an electrical signal having at least one pseudo-random property.

The generating circuit may comprise a generator configured to generate a clock signal and a circuit configured to apply pseudo-randomly a fixed or variable delay to at least some of the edges of said clock signal.

The interconnect portion may comprise a plurality of metallization levels at least one metallization level of which comprises at least one metal track forming at least one portion of said at least one antenna.

According to one embodiment, the device may comprise a first antenna and at least one second antenna, the device comprising a selecting circuit configured to select at least one of said first and second antennae so as to deliver said electrical signal to said at least one selected antenna.

The first antenna and said at least one second antenna may be located in the same metallization level of the interconnect region of the circuit or in distinct metallization levels.

According to one embodiment, the first antenna may be located above a first zone of the integrated circuit and said at least one second antenna may be located above a second zone of the integrated circuit, said second zone being distinct from the first zone.

According to another embodiment, the first antenna may be located above a first zone of the integrated circuit and said at least one second antenna may be located at least partially above said at least one first zone.

The selecting circuit may comprise a control register and logic gates coupled between said antennae and said control register.

BRIEF DESCRIPTION OF THE DRAWINGS

Other advantages and features of the invention will become apparent on examining the detailed description of completely non-limiting modes of implementation and embodiments of the invention, and the appended drawings in which.

DETAILED DESCRIPTION

Figure 1:
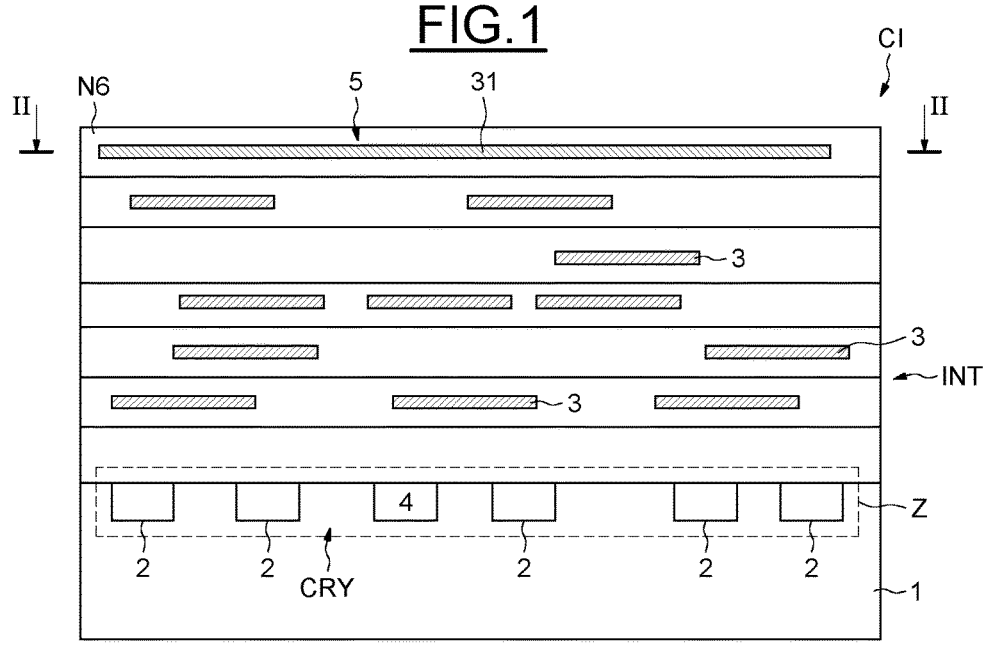
FIGS. 1 to 6 illustrate modes of implementation and embodiments.
Figure 2:
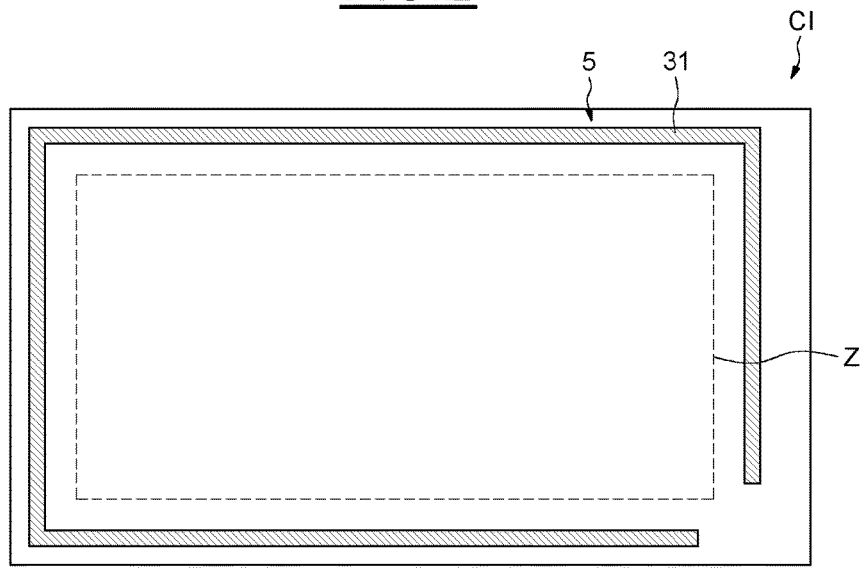

FIG. 1 illustrates an integrated circuit CI, and FIG. 2 is a partial cross-sectional view along the section line II-II in FIG. 1.

The integrated circuit CI includes a semiconductor substrate 1, in which a plurality of components 2 have been produced in a zone Z of the integrated circuit. In this example, all the components of the integrated circuit CI are comprised in the zone Z.

The components here especially include logic gates, for example forming a cryptographic circuit CRY intended especially to carry out operations securely.

The substrate 1 is surmounted with an interconnect region INT (known to those skilled in the art as the BEOL or "Back End Of Line" portion) including a plurality of metal levels each including one or more metal tracks 3 embedded in an insulator (the intermetal dielectric).

Certain metal tracks 3 of the metal levels are interconnect tracks connecting at least some of the components 2 of the zone Z of the integrated circuit to one another by way of vias (not shown for the sake of simplicity).

Other metal tracks may, for example, be supply redistribution tracks or be connected to ground.

The sixth metallization level N6, which here is the highest metallization level, includes a single metal track 31 that is not directly coupled to components of the cryptographic circuit CRY, but, as will be seen below, forms an emissive antenna 5 coupled by way of vias to a generating circuit 4 produced in and on the substrate 1 and configured to generate an electrical signal SE that has a pseudo-random property. The generating cirucit 4 and the antenna 5 here, for example, form an electromagnetic jamming device.

In this example, the sixth metallization level N6 is not therefore an interconnect level because it does not include metal tracks 3 connecting at least some of the components 2 of the zone Z of the circuit to one another, but it is however produced in the same process as that used to produce the various metallization levels.

This being so, it would be entirely possible to envisage the sixth metallization level N6 including interconnect metal tracks lying for example inside the perimeter bounded by the metal track 31.

It should be noted that the emissive antenna 5 could comprise metal loops located in different metallization levels and connected by vias.

Figure 3:
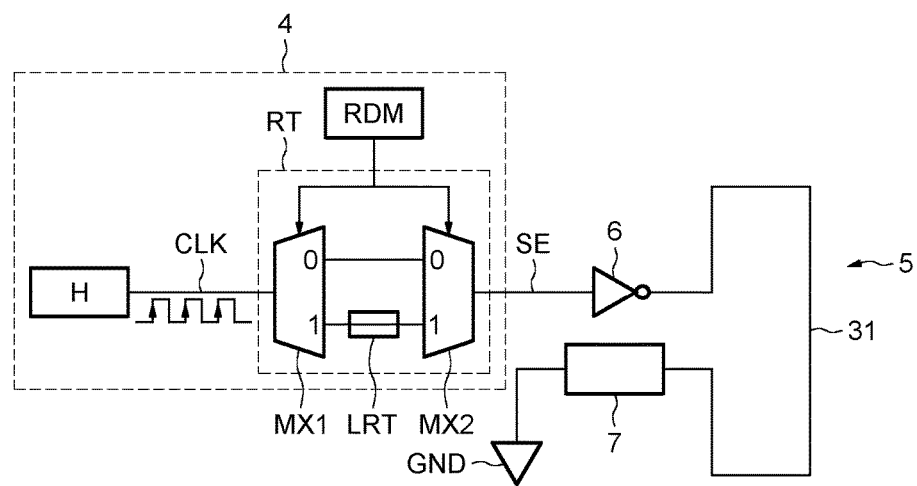

FIG. 3 is a schematic representation of an exemplary embodiment of the circuit 4 configured to generate the electrical signal SE.

The emissive antenna 5 includes the metal track 31 having a first end coupled to a buffering element 6 conventionally serving to amplify and shape the signal SE generated by the generating circuit 4.

A capacitive element 7 is coupled between a second end of the metal track 31 and ground GND. The capacitive element is here used to draw a current to ground GND.

The buffering element 6 and the capacitive element 7 are components produced in and/or on the semiconductor substrate 1, and are electrically connected to the first metal track 31 by vias.

The circuit 4 configured to generate the electrical signal SE comprises a generator H able to deliver a clock signal CLK, the output of which is coupled to a delaying cirucit RT, and a generator RDM of pseudo-random values, the output of which is also coupled to the delaying circuit RT.

It should be noted that the generator H may here also be used by the cryptographic circuit CRY.

The delaying circuit RT, for example, includes a delay line LRT configured to apply a delay to the rising edges of the clock signal CLK.

This delay line LRT is connected by way of a first multiplexer MX1 to the output of the generator H and connected by way of a second multiplexer MX2 to the input of the buffering element 6. The delay line LRT is connected to a first output of the multiplexer MX1 and a first input of the multiplexer MX2.

A direct path, i.e. without delay, is also provided connected to a second output of the multiplexer MX1 and a second input of the multiplexer MX2.

These multiplexers MX1 and MX2 are controlled by the binary value 0 or 1 delivered by the generator RDM of pseudo-random values.

Depending on the value generated by the generator RDM, the delaying circuit RT may or may not select the delay line LRT, so that at least some of the rising edges of the clock signal CLK are delayed or not delayed pseudo-randomly.

Whereas in this embodiment the delay of the delay line LRT is fixed (constant), it would be possible, as a variant, to provide a delay line configured to have a variable delay, for example pseudo-randomly, depending on the logic value delivered by another generator of pseudo-random numbers.

Thus, in the same way as the metal interconnect tracks 3 generate electromagnetic signals depending on the operations carried out by the cryptographic circuit CRY, the metal track 31 of the antenna 5 generates additional electromagnetic signals pseudo-randomly which, by summing with the electromagnetic signals emitted by the metal tracks 3, make it more difficult to analyze the overall electromagnetic signal of the integrated circuit CI.

Figure 4:
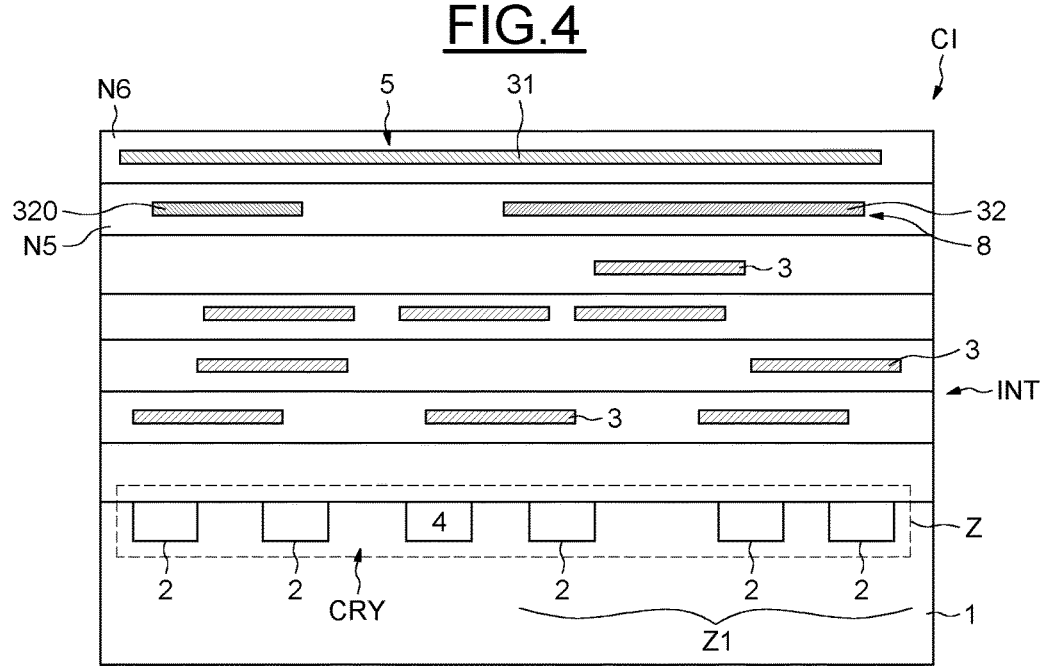
Figure 5:
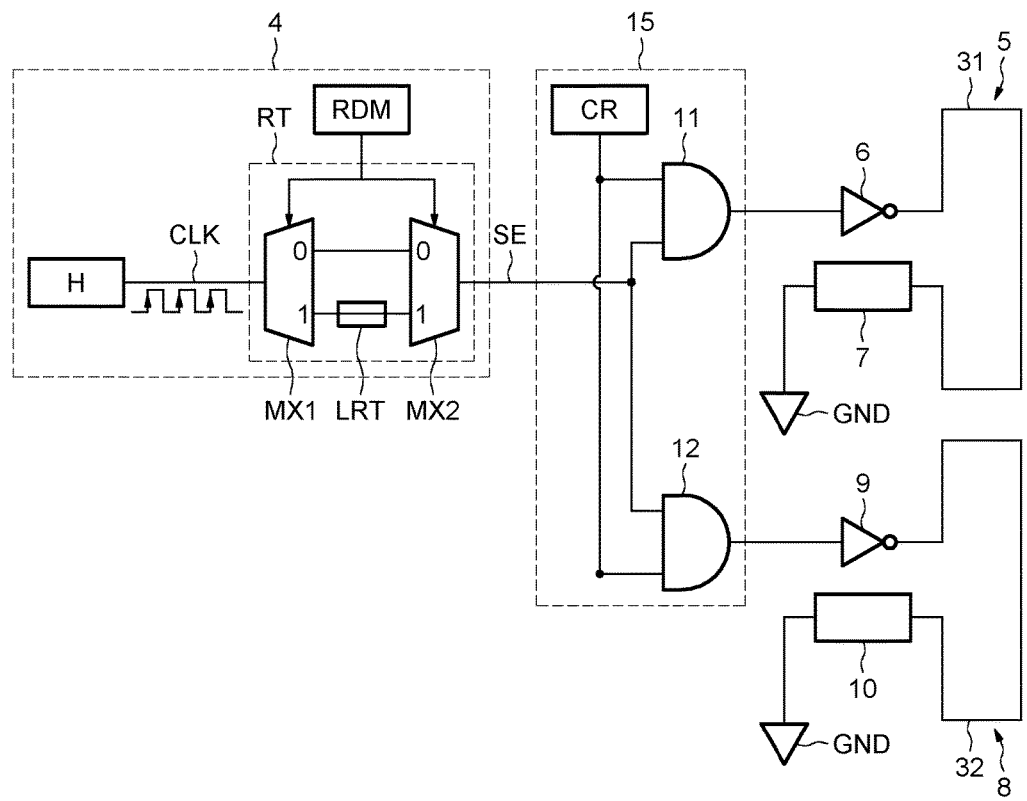

According to another embodiment illustrated in FIGS. 4 and 5, the integrated circuit CI includes a second antenna 8 including a second metal track 32 located in the fifth metallization level N5 and coupled to a second buffering element 9 and to a second capacitive element 10. The second metal track 32 is located above a sub-zone Z1 of the zone Z of the integrated circuit.

The fifth metal level N5 here further comprises one or more metal tracks 320 allowing logic components of the cryptographic circuit CRY to be interconnected.

As illustrated in FIG. 5, the electromagnetic jamming device includes a selecting circuit 15 coupled to the generating circuit 4 and to the first and second antennae 5 and 8.

The selecting circuit 15 comprises, in this exemplary embodiment, a control register CR, a first "AND" logic gate 11 and a second "AND" logic gate 12, and are configured to select the antenna(e) that will receive the electrical signal SE.

The two logic gates 11 and 12 each include two inputs, a first input of which is coupled to the control register CR, and a second input of which is coupled to the output of the generating circuit 4.

The first logic gate 11 includes an output coupled to the first antenna 5 and the second logic gate 12 includes an output coupled to the second antenna 8.

Thus, during operation of the circuit, the control register CR controls one of the first inputs of the logic gates coupled to the antennae that it selects, so that during the generation of a rising front of the electrical signal SE, only the logic gates selected by the control register CR transmit the electrical signal SE to the antennae that are associated therewith.

The selection of the antennae by the control register CR may depend on operations performed by the cryptographic circuit CRY, or as a variant, be made pseudo-randomly so as to jam the electromagnetic emissions even more.

Figure 6:
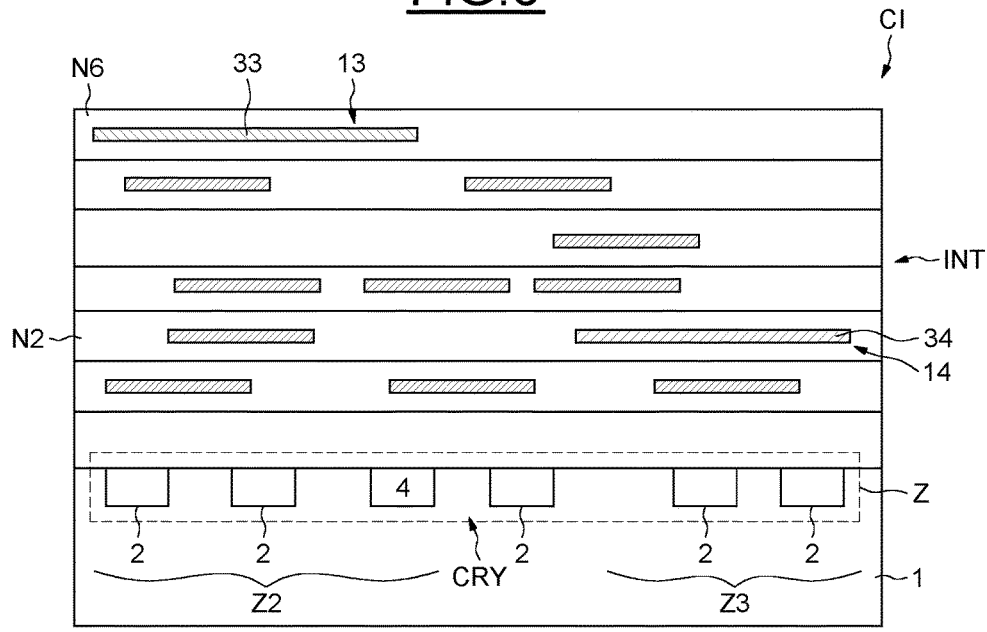

According to one variant illustrated in FIG. 6, the integrated circuit CI includes a first antenna 13 including a first metal track 33 located in the sixth metallization level N6 above a first sub-zone Z2 of the zone Z of the integrated circuit CI, and a second antenna 14 including a second metal track 34 located in the second metallization level N2 above a second sub-zone Z3 of the integrated circuit CI, said second sub-zone being distinct from the first sub-zone Z2.

The zone Z of the integrated circuit CI furthermore includes other components not comprised in the sub-zones Z2 and Z3 and above which no emissive antennae are found.

It should be noted that the modes of implementation and embodiments presented here are in no way limiting. In particular, although the integrated circuits shown here include one or two antennae, it is entirely possible to envisage an integrated circuit including a larger number of antennae, the metal tracks of which are located in one or more metal levels, above one or more zones of the integrated circuit.

Moreover, whereas the pseudo-random property of the electrical signal SE described above was the form factor of the signal, it would be possible to envisage other properties of the signal that could be modified pseudo-randomly, such as for example its amplitude and/or its phase.

The invention claimed is:

1. A method for jamming electromagnetic radiation emitted by a portion of an interconnect region located above at least one zone of an integrated electronic circuit produced in and on a semiconductor substrate, comprising:
    generating a clock signal;
    applying pseudo-randomly a delay to some edges of said clock signal so as to produce an electrical signal having at least one pseudo-random property; and
    driving at least one metal antenna located above said at least one zone of the integrated circuit with said electrical signal, said electrical signal applied directly to an input terminal of said at least one antenna.

2. The method according to claim 1, wherein the delay is one of a fixed delay and a variable delay.

3. The method according to claim 2, wherein the variable delay is a pseudo-randomly varying delay.

4. The method according to claim 1, wherein the at least one metal antenna comprises a first antenna and a second antenna that are placed above said at least one zone of the integrated circuit, the method further comprising:
    selecting one of the first and second antennae, and
    directly applying said electrical signal to the input terminal of the selected antenna.

5. A device, comprising:
    an integrated electronic circuit produced in and on a semiconductor substrate;
    an interconnect region located above the semiconductor substrate;
    at least one antenna located within the interconnect region above at least one zone of the integrated electronic circuit; and
    a generating circuit coupled to said at least one antenna and comprising:
        a clock generator configured to generate a clock signal,
        a delay circuit configured to apply pseudo-randomly a delay to some edges of said clock signal to generate an electrical signal having at least one pseudo-random property, and
        said electrical signal applied directly to an input terminal of said at least one antenna in order to jam electromagnetic radiation liable to be emitted by at least one portion of the interconnect region.

6. The device according to claim 5, wherein the delay circuit is configured to apply pseudo-randomly one of a fixed delay and a variable delay to at least some edges of said clock signal.

7. The device according to claim 6, wherein the variable delay is a pseudo-randomly varying delay.

8. The device according to claim 5, wherein the interconnect region comprises a plurality of metallization levels including at least one metallization level having a metal track forming at least part of said at least one antenna.

9. The device according to claim 5, wherein said at least one antenna comprises a first antenna and a second antenna, further comprising a selecting circuit configured to select at least one of said first and second antennae and apply said electrical signal directly to the input terminal of the selected antenna.

10. The device according to claim 9, wherein the first antenna and the second antenna are located in a same metallization level of the interconnect region.

11. The device according to claim 9, wherein the first antenna and second antenna are located in different metallization levels of the interconnect region.

12. The device according to claim 8, wherein the first antenna is located above a first zone of the integrated circuit and said second antenna is located above a second zone of the integrated circuit.

13. The device according to claim 12, wherein the first and second zones at least partially overlap.

14. The device according to claim 12, wherein the first and second zones do not overlap.

15. The device according to claim 9, wherein the selecting circuit comprises a control register and logic gates coupled between said antennae and said control register, said control register configured to control operation of the logic gates to selectively apply the electrical signal directly to the input terminal of said antennae.

16. A device, comprising:
    a semiconductor substrate;
    a cryptographic integrated circuit including circuit devices formed in and on said semiconductor substrate;
    an interconnect region located above the semiconductor substrate, said interconnect region including metallization levels with metal lines interconnecting the circuit devices of the cryptographic integrated circuit;
    at least one antenna located within a metallization level of the interconnect region at a position above a zone of the integrated electronic circuit wherein the circuit devices of the cryptographic integrated circuit; and
    a generating circuit coupled to said at least one antenna and comprising:
        a clock generator configured to generate a clock signal,
        a delay circuit configured to apply a pseudo-random delay to edges of the clock signal in order to generate an electrical signal having at least one pseudo-random property, and
        said electrical signal applied directly to an input terminal of said at least one antenna to produce pseudo-random electromagnetic signals in order to inhibit detection of cryptographic electromagnetic signals emitted by the metal lines interconnecting the circuit devices of the cryptographic integrated circuit.

17. The method according to claim 4, wherein the selecting one of the first and second antennae is performed in a pseudo-random manner.

18. The device of claim 15, wherein the integrated electronic circuit comprises a cryptographic circuit, said cryptographic circuit coupled to the control register such that selectively applying the electrical signal directly to the input terminal of said antennae depends on operations performed by the cryptographic circuit.

* * * * *